United States Patent
Leung et al.

(10) Patent No.: US 9,209,960 B1
(45) Date of Patent: Dec. 8, 2015

(54) FAST LOCKING CDR FOR BURST MODE

(71) Applicant: Xilinx, Inc., San Jose, CA (US)

(72) Inventors: Caleb S. Leung, San Jose, CA (US); Alan C. Wong, San Jose, CA (US); Christopher J. Borrelli, Campbell, CA (US); Yu Xu, Palo Alto, CA (US); Yohan Frans, Palo Alto, CA (US); Kun-Yung Chang, Los Altos Hills, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/550,576

(22) Filed: Nov. 21, 2014

(51) Int. Cl.
*H04L 7/00* (2006.01)

(52) U.S. Cl.
CPC ............. *H04L 7/002* (2013.01); *H04L 7/0079* (2013.01)

(58) Field of Classification Search
CPC ..... H04L 7/0025; H04L 7/0029; H04L 7/002; H04L 7/0079; H03L 7/0814; H03L 7/085; H03L 7/0998

USPC .......................................... 375/357, 371–376
See application file for complete search history.

(56) References Cited

U.S. PATENT DOCUMENTS

| | | | |
|---|---|---|---|
| 6,545,507 B1 | 4/2003 | Goller | |
| 8,958,517 B2* | 2/2015 | Su | 375/372 |
| 2006/0062341 A1* | 3/2006 | Edmondson et al. | 375/376 |
| 2006/0076993 A1* | 4/2006 | Teo et al. | 327/165 |
| 2009/0086872 A1* | 4/2009 | Liu et al. | 375/371 |

FOREIGN PATENT DOCUMENTS

EP 1648108 A2 4/2006

\* cited by examiner

*Primary Examiner* — Vineeta Panwalkar
(74) *Attorney, Agent, or Firm* — W. Eric Webostad; Bob Brush

(57) ABSTRACT

A method relates generally to a receiver. In such a method, a check of a clock and data recovery block of the receiver for a metastable state is performed. A phase input to a phase interpolator of the receiver is changed to cause the clock and data recovery block of the receiver to exit the metastable state within a time limit. To check for the metastable state, a phase difference in received data is determined, and the phase difference is determined to be less than a threshold for the clock and data recovery block being in the metastable state.

19 Claims, 5 Drawing Sheets

FAST LOCKING CDR FOR BURST MODE

TECHNICAL FIELD

The following description relates to integrated circuit devices ("ICs"). More particularly, the following description relates to fast locking clock and data recovery for a burst mode for a receiver in an IC.

BACKGROUND

Receivers are used in wired or wireless data communications. In some networks, whether for mobile phone, Internet, Voice-Over-Internet-Protocol ("VOIP"), data centers, and other networks, a clock signal is inferred from the data. In such applications, receivers use clock and data recovery ("CDR") to obtain a recovered clock from transmitted data. This transmitted data may be sent in short burst packets, where each packet includes a preamble followed by data payload. Packets may be driven from transmitters on networks with different phases relative to one another. Receivers with CDR may be configured to track each new burst of data, and this tracking may have a time limit limited by length of a preamble. Hence, it is desirable and useful to provide fast locking CDR for a burst mode.

SUMMARY

A method relates generally to a receiver. In such a method, a check of a clock and data recovery block of the receiver for a metastable state is performed. A phase input to a phase interpolator of the receiver is changed to cause the clock and data recovery block of the receiver to exit the metastable state within a time limit. To check for the metastable state, a phase difference in received data is determined, and the phase difference is determined to be less than a threshold for the clock and data recovery block being in the metastable state.

An apparatus relates generally to a receiver system. In such an apparatus, a clock and data recovery block is coupled to receive samples to determine a first phase value and a second phase value of the samples. The first phase value and the second phase value are determined at different times. A phase interpolator is coupled to the clock and data recovery block to receive a phase input from the clock and data recovery block. The clock and data recovery block is configured to change the phase input to exit a metastable state of the clock and data recovery block.

An apparatus relates generally to receiver. In such an apparatus, a clock and data recovery block is coupled to receive samples to determine a first phase value and a second phase value of the samples to provide a phase interpolator input. The first phase value and the second phase value are determined at different times. The clock and data recovery block is configured to determine a phase difference between the first phase value and the second phase value. The clock and data recovery block is configured to change the phase interpolator input for the phase difference being less than a threshold.

Other features will be recognized from consideration of the Detailed Description and claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 4-1 through 4-4 are the same signal diagram depicting exemplary RX data for exemplary samplings, respectively.

DETAILED DESCRIPTION

Figure 1:
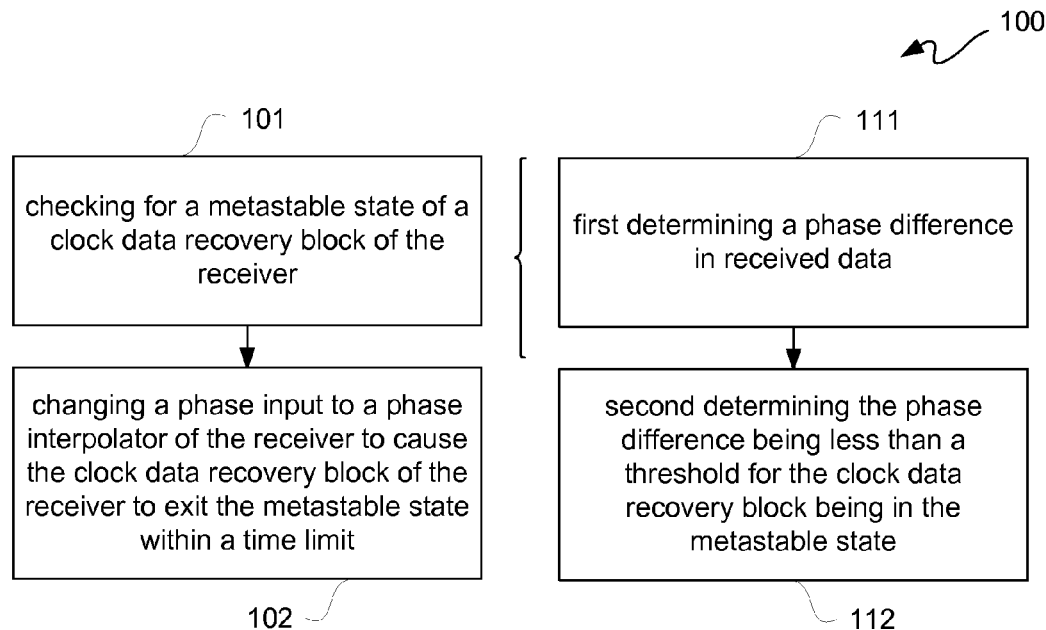
FIG. 1 is a flow diagram depicting an exemplary clock and data recovery ("CDR") process of a receiver.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

For some receivers, a clock signal may be obtained by alignment of phase to samples, which is known as obtaining a lock. For some high-speed applications, there may be a short amount of time allotted for obtaining such a lock. A circuit in a receiver used to obtain a lock to generate a clock signal may thus have little time for acquiring such a lock in order to avoid outputting erroneous information. Along those lines, a clock signal may be inferred by taking samples of a received transmission and determining how to align to phase of such samples. Generation of phase information from such samples may be performed by what is known as clock and data recovery.

As described below in additional detail, to ensure clock and data recovery obtains a lock within a limited time, such clock and data recovery cannot be in a "stuck" position for any extended length of time. This stuck position may be referred to as a metastable state. This may be analogized to a ball on top of a hill. At the top of the hill the ball is temporarily stuck, but will eventually roll down the hill. However, there is not enough time to wait for the ball to eventually roll down the hill, so the ball is pushed to make the ball roll down the hill sooner. In the description below, phase is the ball, and phase is pushed by forcibly shifting a current phase value to obtain a lock sooner. In the analogy, the correct position of the final position of the ball is at the bottom of the hill, and the ball will reach this correct position faster from the middle of the slope than from the top of the hill. If the ball is at the top of the hill (i.e., a metastable state) or at the bottom of the hill (i.e., a stable state), the ball can be moved to the slope so that in both situations (i.e., states), the ball eventually rolls back to the bottom of the hill. Of course this is just an analogy for purposes of understanding only, and should not be taken to limit the description below, where phase may be pushed by a forced shift to obtain a lock sooner.

As described below in additional detail, a determination may be made as to whether a clock and data recovery block is in a metastable state. If a clock and data recovery block is in a metastable state, a phase value may be shifted in order to more quickly obtain a lock.

With the above general understanding borne in mind, various configurations for a receiver are generally described below.

FIG. 1 is a flow diagram depicting an exemplary clock and data recovery ("CDR") process 100 of a receiver. CDR process may be used to obtain a CDR lock for burst mode applications, such as approximately 10 gigabit ("10G") Passive Optical Network ("PON") applications. For example, a CDR lock time of under 400 ns may be obtained for 10G EPON applications.

CDR process 100 at 101 checks for a metastable state of a CDR block of a receiver. At 102, CDR process 100 changes a phase input to a phase interpolator of such receiver to cause such a CDR block of such a receiver to exit such a metastable state within a time limit. This time limit is much shorter than a CDR lock time limit for burst mode applications; however, forcing a CDR block out of a metastable state allows such a CDR block to obtain a lock for burst mode applications within a limited time, which may be specified for such applications.

Checking at 101 may include operations at 111 and 112. At 111, a phase difference in received data may be determined. At 112, such phase difference may be determined as being less than a threshold for a CDR block. This lack of change in phase difference may indicated that such a CDR block is in a metastable state.

Figure 2:
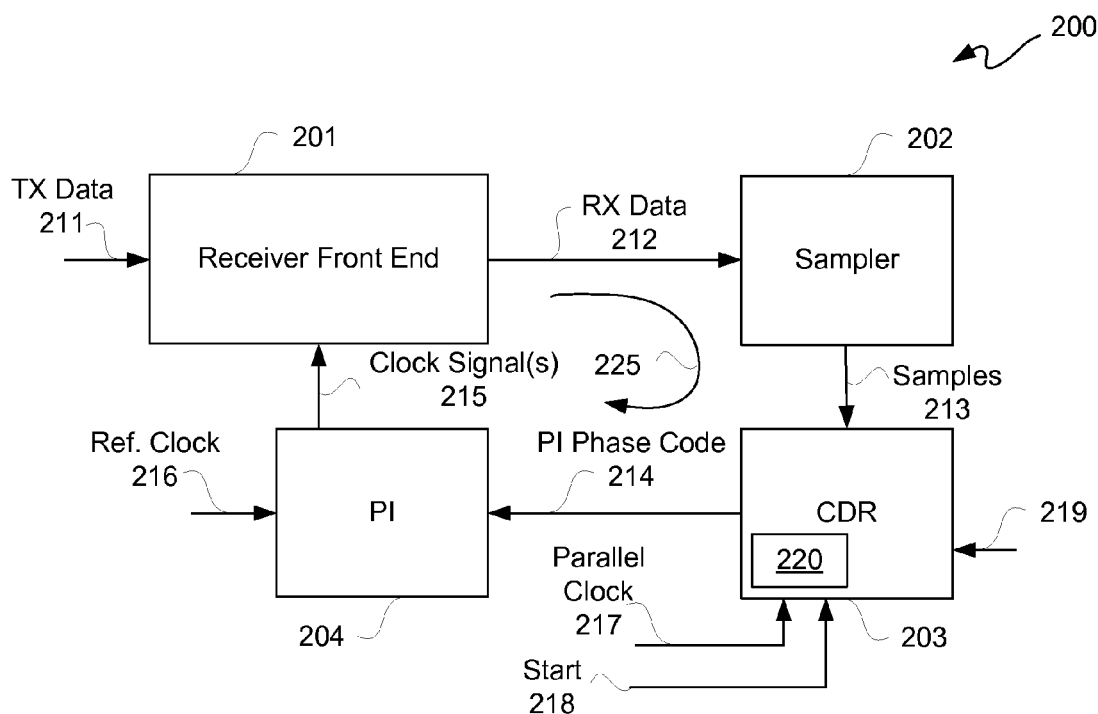
FIG. 2 is a block diagram depicting an exemplary receiver system.

FIG. 2 is a block diagram depicting an exemplary receiver system 200. Receiver system 200 includes a receiver front end 201, a sampler 202, a CDR block 203, and a phase interpolator ("PI") 204. CDR block 203 may include a metastable checker circuit 220, as described below in additional detail. As receiver front end 201, sampler 202, and PI 204 are well known, unnecessary details regarding same are not described herein for purposes of clarity.

Receiver front end 201 may be coupled to receive transmitted ("TX") data 211 to provide received ("RX") data 212. Sampler 202 may be coupled to receive RX data 212 to provide samples 213. As is well known, RX data 212 may be multiple signals overlapping one another forming data eyes with data crossings. Along those lines sampler 202 may output samples 213, which may include data samples and crossing samples. A sampling clock signal (not shown) may be provided to sampler 202 for any of a variety of types of sampling.

CDR block 203 may be coupled to receive samples 213, such as data samples, to determine a first phase value and a second phase value of such samples 213. These first and second phase values may be determined at different times, namely sufficiently spaced apart in time to determine whether CDR block 203 is stuck in a metastable state. Sampler 202 may be coupled to sample RX data 212 to provide first samples and second samples of samples 213, and CDR block 203 may be coupled to determine a first phase value from such first samples and a second phase value from such second samples of samples 213.

A receiver system 200 may be configured to convert serial data to parallel data. Along those lines, CDR block 203 may be configured to have a phase value determination interval between determining a first phase value and a second phase value. This interval may be X number of clock cycles of a parallel clock signal 217 provided to CDR 203 multiplied by Y unit intervals ("UIs"). For example, CDR block 203 may be configure to determine a second phase value approximately four (4) parallel clock cycles of parallel clock signal 217 multiplied by approximately 32 UIs, or approximately 128 UIs, after determining a first phase value. For example, for approximately a 10G networking application, such as 10G EPON or other burst mode CDR ("BMCDR") applications, 10G is the data rate, and a UI is an inverse of the data rate. For a BMCDR application, a CDR lock may be specified to be 800 UIs or less.

A checker circuit 220 can be implemented through a configuration data stream in programmable resources of a programmable logic device, such as FPGA fabric, or may be implemented in dedicated circuitry ("hardware"). For an implementation in programmable resources, a CDR block 203 status can be monitored by using a digital monitor block ("DMON") of a transceiver in an FPGA or by a direct port connection. Digital logic may be implemented in FPGA fabric or dedicated circuitry to determine whether a recovered clock is to be adjusted in order to meet a lock time limit. A recovered clock phase can then be overwritten in a timely manner, such as via dynamic reconfiguration port ("DRP") of an FPGA connected to a CDR block, or through dedicated override logic. A start signal 218 may be provided to checker circuit 218 for reasons described below in additional detail. Start signal 218 may be asserted to indicate start of a new burst for received data.

A phase interpolator 204 may be coupled to CDR block 203 to receive a PI phase code input ("phase input") 214 from CDR block 203. CDR block 203 may be configured to change phase input 214 to exit a metastable state of CDR block 203.

Checker circuit 220 of CDR block 203 may be configured to determine a phase difference between a first phase value and a second phase value. Checker circuit 220 of CDR block may be configured to change phase input 214 for a phase difference being less than a threshold value ("threshold"), which may be provided to checker circuit 220 of CDR 203 via threshold signal 219.

In response to phase input 214 and a reference clock signal 216 respectively provided to phase interpolator 204, phase interpolator 204 may generate one or more clock signals 215 for operation of receiver system 200. One of more of clock signals 215 may be provided to receiver front end 201.

Figure 3:
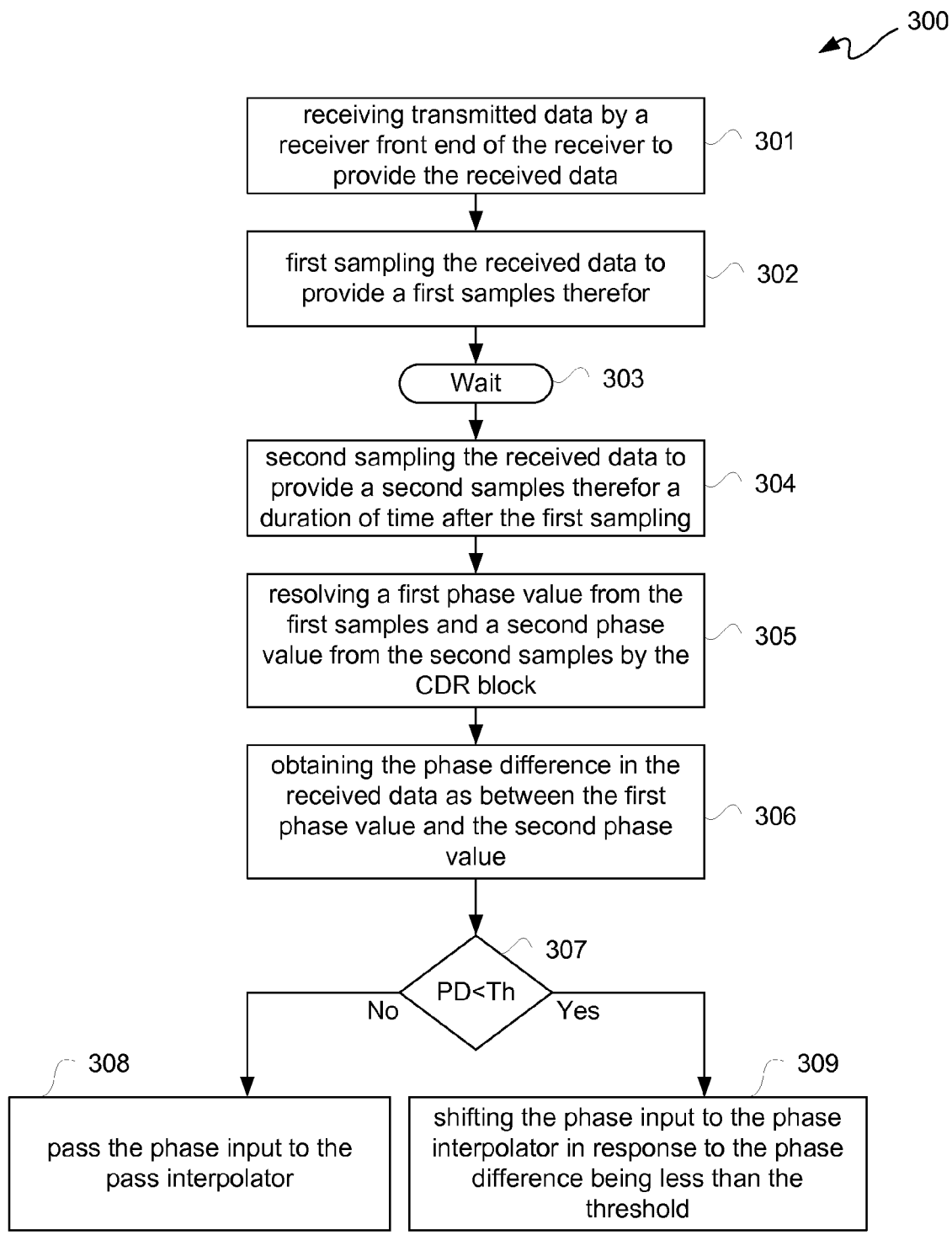
FIG. 3 is a flow diagram depicting an exemplary CDR process for the receiver system of FIG. 2.

FIG. 3 is a flow diagram depicting an exemplary CDR process 300 for a receiver system 200. CDR process 300 may be used with CDR process 100 of FIG. 1. With simultaneous reference to FIGS. 1-3, CDR process 300 is further described.

At 301, TX data 211 may be received by a receiver front end 201 of a receiver system ("receiver") 200 to provide RX data 212. At 302, RX data 212 may be sampled by sampler 202 to provide a first samples therefor, which may be followed by a wait time 303, such as previously described.

At 304, RX data 212 may be sampled by sampler 202 to provide a second samples therefor, a wait time duration of time after first sampling at 302. At 305, a first phase value may be resolved from such first samples and a second phase value may be resolved from such second samples by CDR block 203. Optionally at 305, additional phase values may be read by checker circuit 220 between such first and second phase values read to allow averaging of all or some of such phase values, such as any or all additional phase values and such first and second phase values, and an average value obtained by such averaging may be subsequently used for noise rejection. For example, checker circuit 220 may be configured to take one or more additional readings during a predetermined duration between such first and second readings respectively for such first and second phase values. For purposes of clarity by way of example and not limitation, it shall be assumed that such first samples and such second samples respectively are first data samples and second data samples.

At 306, a phase difference in RX data 212 may be obtained as between such first and second phase values. At 307, such phase difference may be compared to a threshold. If such phase difference is greater than or equal to such threshold, then at 308 a phase input may be passed as an input to phase interpolator 204 without any change or shift to exit a metastable state of CDR block 203, as CDR block 203 is not detected to be in a metastable state. However, if at 307 such phase difference is less than such threshold, then at 309 a phase input may be shifted before providing as an input to phase interpolator 204 to exit a metastable state of CDR block 203, as CDR block 203 is detected to be in a metastable state.

A phase input at 308 may be either such first phase value or such second phase value. A phase input at 309 may be either such first phase value or such second phase value shifted by plus or minus approximately 90 degrees or some other amount to cause CDR block 203 to exit a metastable state via propagation of such information around loop 225 of receiver 200. Such first phase value and such second phase value respectively may be a first phase interpolator code value and a second phase interpolator code value. Such threshold may be a change or delta which is approximately four increments of a phase interpolator code of phase interpolator 204. For example, a phase interpolator 204 may divide a UI into a number of evenly spaced tics, such as 16, 32, 64, or some other number, and four increments may thus represent a fixed phase difference.

Figures 1, 4:
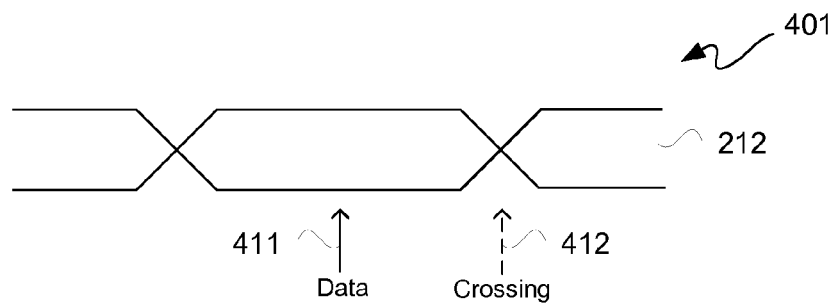
Figures 2, 4:
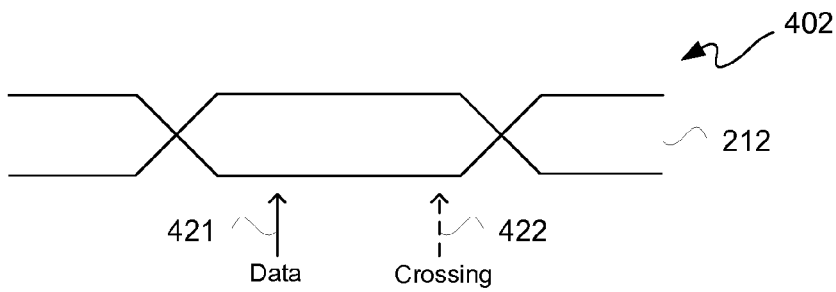
Figures 3, 4:
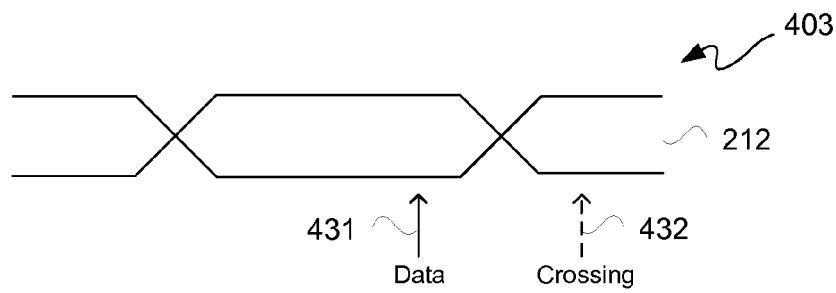
Figure 4:
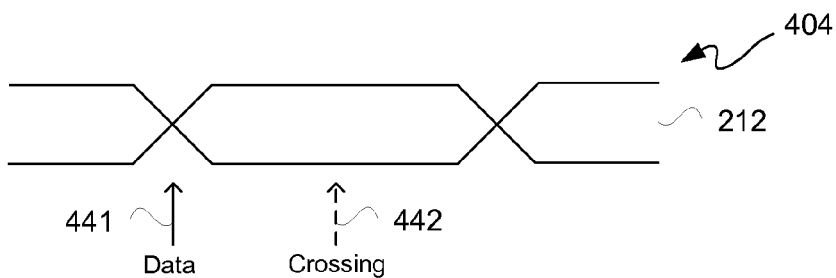

To more clearly understand a metastable state of a CDR block, it shall be assumed that a bang-bang CDR is used, where data is sampled central to a data eye and crossings are 0.5 UI away from data samples. FIGS. 4-1 through 4-4 are the same signal diagram depicting exemplary RX data 212 for exemplary samplings 401-404, respectively.

For sampling 401, data is sampled at 411, and a corresponding crossing is at 412. In this example, an RX clock used by sampler 202 is positioned for sampling data at the center of a data eye, and so each crossing sample has a 50 percent chance as being the same as a current data sample corresponding thereto. For example, if data is a logic 1, then there is a 50-50 chance that a crossing is a logic 1.

For sampling 402, data is sampled at 421, and a corresponding crossing is at 422. In this example, an RX clock used by sampler 202 is positioned for sampling data early, namely to the left of the center of a data eye, and so each crossing sample is very likely going to be the same as a current data sample corresponding thereto.

For sampling 403, data is sampled at 431, and a corresponding crossing is at 432. In this example, an RX clock used by sampler 202 is positioned for sampling data late, namely to the right of the center of a data eye, and so each crossing sample is very unlikely going to be the same as a current data sample corresponding thereto.

For sampling 404, data is sampled at 441, and a corresponding crossing is at 442. In this example, an RX clock used by sampler 202 is positioned for sampling data 0.5 UI offset from the center of a data eye, namely to the left of the center of a data eye at an early crossing location, and so each crossing sample has a 50 percent chance as being the same as a current data sample corresponding thereto. For example, if data is a logic 0, then there is a 50-50 chance that a crossing is a logic 0.

With this information, a CDR feedback loop 225 can be built with digital logic to maintain the position of an RX clock used by data sampler 202 to sample at the center of RX data eye and quickly correct for any movement of such RX clock relative to RX data stream 212. However, if an RX clock is positioned as in FIG. 4-4, then a CDR 203 may have data samples matching crossing samples (early) and have data samples not matching crossing samples (late), which appears to be similar to operation of an RX clock as in FIG. 4-1, but is actually a metastable state of CDR 203. While loop 225 may ultimately recover and exit such metastable state of CDR 203, processing corrupted data for such exit may take an extended period of time. In other words, loop 225 may be unable to recover a proper clock position as in FIG. 4-1 for an extended period of time.

For example in 10G EPON and other BMCDR applications, a CDR block is to quickly adjust an RX clock during a preamble of a packet to recover data from a packet that may be of any arbitrary phase. While in many instances, a CDR block may quickly adjust such RX clock to the phase of a newly received packet. An exception is if the previous data packet has a phase offset of exactly 0.5 UI from the current packet, as this relationship may result in a metastable state within CDR block 203 as described above. For a CDR block in a metastable state, CDR lock time might exceed the length of the preamble of a packet, leading to receive data errors.

Figure 5:
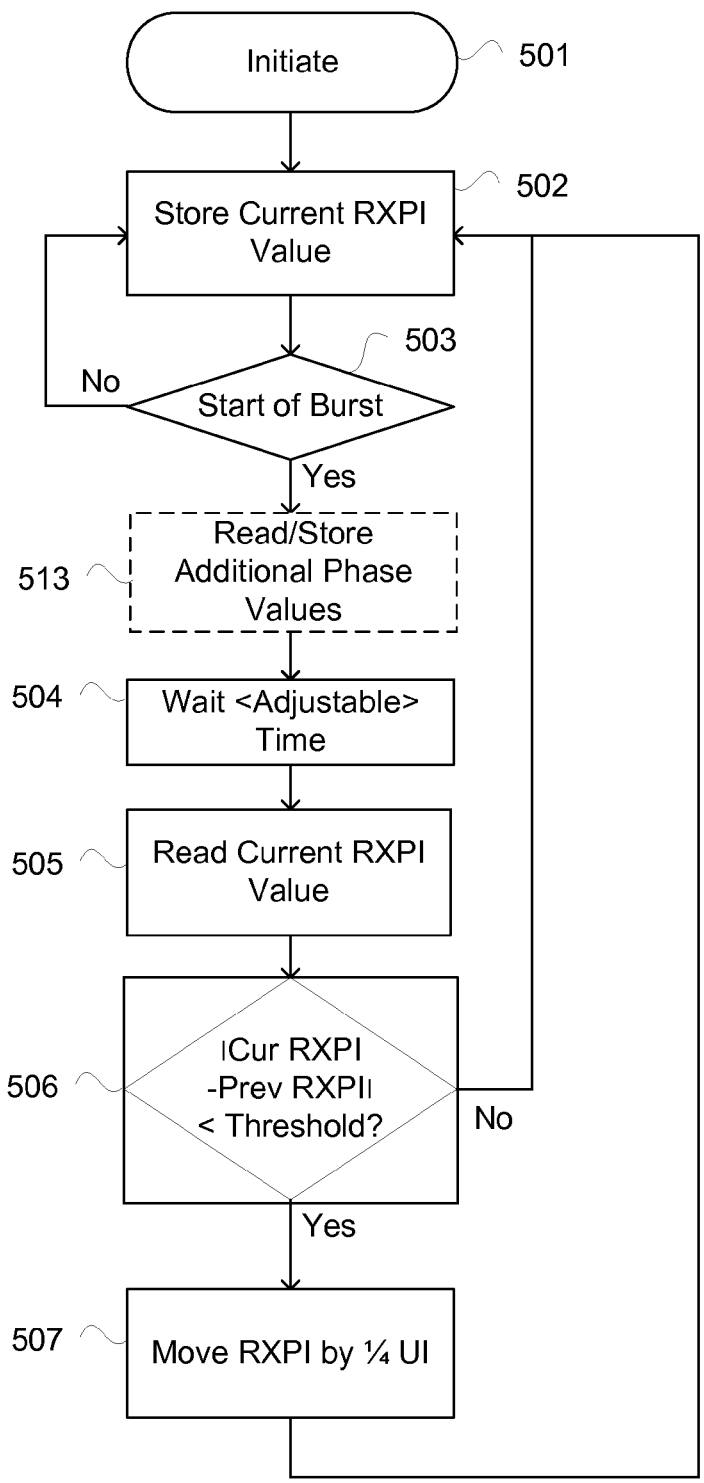
FIG. 5 is a flow diagram depicting an exemplary checker flow which may be used by a checker circuit for CDR.

FIG. 5 is a flow diagram depicting an exemplary checker flow 500 which may be used by checker circuit 220. At 501, checker flow 500 may be initiated. At 502, a current RX PI code value determined by CDR block 203 may be stored, such as in a register.

At 503, it may be determined whether a start of a burst signal has been asserted. A start signal 218 may be asserted responsive to a data burst start of RX data. This is a known signal, and so generation of such signal is not described in unnecessary detail for purposes of clarity. If at 503 no data burst start is detected, then a current RX PI code value determined by CDR block 203 may be stored at 502. Optionally, this storing at 502 may be a registering in a register of a phase value responsive to assertion of such a start signal provided to such register.

If at 503 a data burst start is detected, then at 504 a wait time is invoked. Optionally, this wait time may be adjustable to accommodate a variety of applications. This wait time may be for counting a number of clock pulses of a clock signal provided to a counter. Again, the number to count to may vary from application to application. Additionally, optionally at 513 during such wait time additional phase values may be read, including temporarily stored, for purposes of averaging as previously described.

After waiting at 504, at 505 a current RX PI code value determined by CDR block 203 may be read or stored responsive to lapse of a wait time duration and assertion of a burst start signal. Optionally, this storing at 502 may be a registering in another register of another phase value responsive to assertion of such a count reach signal provided to such register from such a counter, along with a new burst having started. In other words, this registering of another phase value may be responsive to reaching the number of clock pulses and assertion of a burst start signal for a current burst.

A first phase value stored at 502 and a second phase value read or stored at 505 may be provided to determine any phase difference at 506. For example, a previous phase value stored at 502 may be subtracted from a current phase value read or stored at 505 as respectively provided to a subtractor, and an absolute value of this subtraction result may be obtained, such as by an absolute value circuit. This phase difference may be compared at 506, such as by a comparator, against a threshold provided to such comparator.

If this phase difference is not less than a threshold as determined at 506, then phase is moving sufficiently to indicate that CDR block 203 is not in a metastable state. For such an outcome, from 506 checker flow 500 may transition back to an operation at 502, where a current RX PI code value determined by CDR block 203 may be stored.

If this phase difference is less than a threshold as determined at 506, then phase is not moving sufficiently to indicate that CDR block 203 is not in a metastable state. In other words, phase is moving so slightly so as to indicate that CDR block 203 is in a metastable state. For such an outcome, from 506 checker flow 500 may shift or move a current RX PI code value determined by CDR block 203 by a fixed amount at 507. In this example, this fixed amount is ¼ of a UI for an application. However, this or another amount of shift may be used. If an RX PI 204 cannot adjust phase by a sufficient amount in one override operation, multiple incremental phase overrides may be used to move such phase by a sufficient amount. Along those lines, shifting of a phase input to an RX PI 204 may be a sequence of 2 or more partial phase adjustments or shifts.

Along the above lines, output of a comparator used at 506 may be provided as a control select to a multiplexer. One input to such multiplexer may output of an adder coupled to receive a fixed shift amount to be added to either such previous or current RX PI phase code value, and another input to such multiplexer may be either such previous or current RX PI phase code value. For purposes of clarity by way of example and not limitation, it shall be assumed that a current PX PI phase code value read at 505 is used. Effectively, such an adder may be coupled to shift a phase input to phase interpolator 204 in response to a phase difference being less than a threshold.

After a shift or other move of an RX PI phase code value input to a phase interpolator at 507, checker flow 500 may store at 502 a current RX PI code value determined by CDR block 203. Effectively, such a shift at 507 after propagating around loop 225 shifts or "kicks" CDR block 203 out of its metastable state. Accordingly, by storing at 502, CDR status can be read just prior to the start of each burst by continuously storing such CDR status and then reading such CDR status again a short time later. If the difference between these status readings is within a programmably adjustable threshold, this indicates that a CDR block 203 is stuck in a metastable state and an RX PI code value is to be adjusted.

Generally, this metastable instability occurs when CDR block 203 is attempting to acquire a lock on a new data burst, while maintaining CDR stability in a normal operating mode. A quick CDR decision may be facilitated by directly reading an RX PI code value for a recovered clock, either through a DMON in an FPGA implementation or within a digital checker circuit 220 in CDR block 203. A one-time override of an RX PI code value for a burst may be provided by a controllable value, which may be a fixed value, responsive to detecting metastability to allow fast CDR correction without creating instability, such as in a CDR feedback loop for example.

In a BMCDR application, during the start of a data burst, an application cannot detect whether a CDR is properly aligned to RX data in a receiver. However, an application can detect that a receiver is toggling due to a packet being present, and can issue a signal that indicates a start of burst. This start signal may be provided to BMCDR circuitry, such as a digital checker circuit 220. Based on this ability to detect start of burst by an application, checker circuit 220 may monitor CDR state and adjusts CDR block 203 immediately after the start of a data packet. By employing BMCDR circuitry, such as a digital checker circuit 220, to adjust a CDR block only when an application sends a start of burst signal and a metastable state is thereafter detected, maximum movement may be provided only when a CDR block 203 is trying to acquire or lock to a clock phase, while maintaining CDR stability when receiving normal data.

At 507, a ¼ UI movement or shift may be used, or a value approximating such a ¼ UI movement. From a comparison between FIGS. 4-1 and 4-4, it might be suggested to adjust clock phase by 0.5 UI so that an RX clock is positioned correctly immediately responsive to detection of a CDR metastable state. However, checker circuit 220 adjusts off both whether a CDR is stable with 0 UI offset or is metastable with 0.5 UI offset. With respect to the former, if checker circuit 220 moves phase of an RX clock by 0.5 UI when it was already stable initially, such a move of this RX clock may be to a metastable region and cause a longer lock time. By providing a controllably adjustable phase adjustment at 507, a suggested value of 0.25 UI or thereabouts offset from an initial value may provide a quick CDR phase lock for both stable and metastable states of CDR block 203. In other words, at this shifted position, a CDR block 203 can quickly adjust an RX clock to a correct phase.

While the above description has been in terms of optical networks, such description is not limited to optical networks but may be used for receivers in other types of high-speed networks. Even though PONS were described, the above description is not limited to PONS but may be used for receivers in Active Optical Networks ("AONs") or a combination thereof. Furthermore, the above-description is not limited to CDR blocks, and may be used for improving lock times on PLLs and DLLs with similar bang-bang phase detection and correction through feedback loops. For PLLs that have an added second order frequency loop, some frequency adjustments may be added.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O")

resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 6:
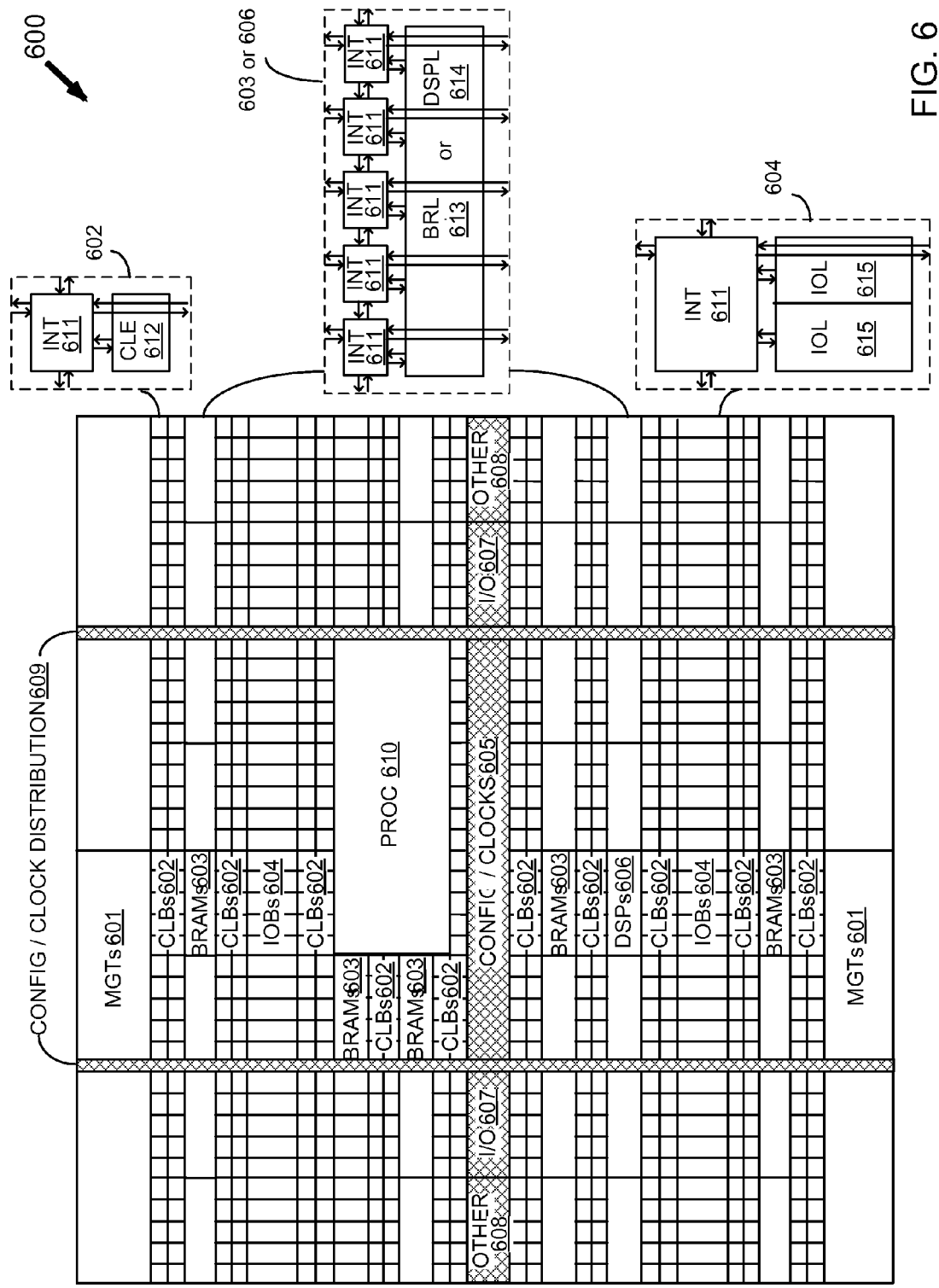
FIG. 6 is a simplified block diagram depicting an exemplary columnar Field Programmable Gate Array ("FPGA") architecture.

As noted above, advanced FPGAs can include several different types of programmable logic blocks in the array. For example, FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile includes a programmable interconnect element ("INT") 611 having standardized connections to and from a corresponding interconnect element in each adjacent tile. Therefore, the programmable interconnect elements taken together implement the programmable interconnect structure for the illustrated FPGA. The programmable interconnect element 611 also includes the connections to and from the programmable logic element within the same tile, as shown by the examples included at the top of FIG. 6.

For example, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element ("DSPL") 614 in addition to an appropriate number of programmable interconnect elements. An IOB 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured embodiment, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for a receiver, comprising:
checking for a metastable state of a clock and data recovery block of the receiver; and
changing a phase input to a phase interpolator of the receiver to cause the clock and data recovery block of the receiver to exit the metastable state within a time limit;
wherein the checking comprises:
first determining a phase difference between a first phase value and a second phase value of received data, the first phase value and the second phase value being determined at different times; and
second determining the phase difference being less than a threshold for the clock and data recovery block being in the metastable state.

2. The method according to claim 1, further comprising:
receiving transmitted data by a receiver front end of the receiver to provide the received data;
first sampling the received data to provide a first samples therefor;
second sampling the received data to provide a second samples therefor a duration of time after the first sampling;
resolving the first phase value from the first samples and the second phase value from the second samples by the clock and data recovery block;
comparing the phase difference to the threshold; and
shifting the phase input to the phase interpolator in response to the phase difference being less than the threshold.

3. The method according to claim 2, wherein the phase input is either the first phase value or the second phase value shifted by plus or minus approximately 90 degrees of one unit interval (UI) period to cause the clock and data recovery block to exit the metastable state.

4. The method according to claim 2, wherein the shifting of the phase input is a sequence of 2 or more partial adjustments.

5. The method according to claim 2, wherein:
the first samples and the second samples respectively are first data samples and second data samples; and
the first phase value and the second phase value respectively are a first phase interpolator code value and a second phase interpolator code value.

6. The method according to claim 2, wherein the threshold is approximately four increments of a phase interpolator code.

7. The method according to claim 2, further comprising:
asserting a start signal responsive to a data burst start of the received data;
first registering the first phase value;
counting a number of clock pulses of a clock signal; and
second registering the second phase value responsive to reaching the number of clock pulses from assertion of the start signal.

8. A receiver system, comprising:
a clock and data recovery block configured to receive samples to determine a first phase value and a second phase value of the samples and determine a phase difference between the first phase value and the second phase value;
wherein the first phase value and the second phase value are determined at different times; and
a phase interpolator coupled to the clock and data recovery block to receive a phase input from the clock and data recovery block;
wherein the clock and data recovery block is configured to change the phase input to exit a metastable state of the clock and data recovery block.

9. The system according to claim 8, wherein the clock and data recovery block is configured to change the phase input for the phase difference being less than a threshold.

10. The system according to claim 9, further comprising:
a receiver front end coupled to receive transmitted data to provide received data; and
a sampler coupled to receive the received data to provide the samples.

11. The system according to claim 10, wherein:
the sampler is coupled to sample the received data to provide first samples and second samples of the samples; and
the clock and data recovery block is coupled to determine the first phase value from the first samples and the second phase value from the second samples.

12. The system according to claim 11, wherein the phase input is either the first phase value or the second phase value shifted by plus or minus approximately 90 degrees to cause the clock and data recovery block to exit the metastable state.

13. The system according to claim 11, wherein the first samples and the second samples respectively are first data samples and second data samples.

14. The system according to claim 11, wherein the first phase value and the second phase value respectively are a first phase interpolator code value and a second phase interpolator code value.

15. The system according to claim 11, wherein the threshold is approximately four increments of a phase interpolator code.

16. A receiver, comprising:
a clock and data recovery block coupled to receive samples to determine a first phase value and a second phase value of the samples to provide a phase interpolator input;
wherein the first phase value and the second phase value are determined at different times;
wherein the clock and data recovery block is configured to determine a phase difference between the first phase value and the second phase value; and
wherein the clock and data recovery block is configured to change the phase interpolator input for the phase difference being less than a threshold.

17. The receiver according to claim 16, wherein:
the clock and data recovery block is coupled to determine the first phase value from the first samples and the second phase value from the second samples; and
the clock and data recovery block comprises a checker circuit configured to:
store the first phase value;
read the second phase value a duration of time after the first phase value is stored;
provide the phase difference between the first phase value and the second phase value;
compare the phase difference to the threshold; and
shift the phase interpolator input to the phase interpolator in response to the phase difference being less than the threshold.

18. The receiver according to claim 17, wherein:
the checker circuit is further configured to read additional phase values between the first phase value and the second phase value;
the checker circuit is coupled to receive a start signal indicating start of a burst; and
the second phase value is read responsive to assertion of the start signal and reaching the duration of time.

19. The receiver according to claim 18, wherein the phase input is either the first phase value or the second phase value shifted by plus or minus approximately 90 degrees to cause the clock and data recovery block to exit the metastable state.

* * * * *